United States Patent
Reed et al.

(10) Patent No.: US 8,275,558 B2
(45) Date of Patent: Sep. 25, 2012

(54) VISUAL INSPECTION-BASED GENERATOR RETENTION ASSEMBLY TIGHTNESS DETECTION

(75) Inventors: Francis Alexander Reed, Princetown, NY (US); Robert Martin Roney, Jr., Schoharie, NY (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 12/695,439

(22) Filed: Jan. 28, 2010

(65) Prior Publication Data

US 2011/0184661 A1 Jul. 28, 2011

(51) Int. Cl.
*G01B 3/44* (2006.01)
(52) U.S. Cl. .................................................. 702/34
(58) Field of Classification Search .............. 702/34
See application file for complete search history.

(56) References Cited

U.S. PATENT DOCUMENTS

| | | | | |
|---|---|---|---|---|
| 3,690,775 A * | 9/1972 | Cousins | ............ | 356/241.4 |
| 4,422,320 A | 12/1983 | Moorby et al. | | |
| 4,541,721 A * | 9/1985 | Dewar | ............ | 356/623 |
| 4,549,207 A | 10/1985 | Boshier | | |
| 4,901,572 A * | 2/1990 | Suyama | ............ | 73/572 |
| 5,012,684 A * | 5/1991 | Humphries | ............ | 73/865.8 |
| 5,020,234 A | 6/1991 | Alkire et al. | | |
| 5,070,401 A * | 12/1991 | Salvati et al. | ............ | 348/141 |
| 5,105,658 A | 4/1992 | Jaafar et al. | | |
| 5,295,388 A * | 3/1994 | Fischer et al. | ............ | 73/12.09 |
| 5,524,474 A * | 6/1996 | Lavallee et al. | ............ | 73/12.09 |
| 5,635,780 A | 6/1997 | Kohlert et al. | | |
| 5,640,472 A * | 6/1997 | Meinzer et al. | ............ | 385/26 |
| 6,100,711 A * | 8/2000 | Hatley | ............ | 324/765.01 |
| 2006/0038988 A1 | 2/2006 | Thermos | | |
| 2006/0146127 A1* | 7/2006 | Bagley et al. | ............ | 348/83 |
| 2006/0283234 A1 | 12/2006 | Fischer et al. | | |
| 2007/0277630 A1* | 12/2007 | Bagley et al. | ............ | 73/865.9 |
| 2008/0087113 A1 | 4/2008 | Bagley et al. | | |
| 2009/0243419 A1 | 10/2009 | Humphries et al. | | |
| 2009/0301168 A1* | 12/2009 | Moore | ............ | 73/12.09 |

FOREIGN PATENT DOCUMENTS

EP 0415042 B1 12/1994
EP 2194388 A2 6/2010

OTHER PUBLICATIONS

Great Britian Search Report issued in connection with GB Patent Application No. GB1101285.3, Feb. 17, 2011.

* cited by examiner

*Primary Examiner* — Cindy H Khuu
*Assistant Examiner* — Timothy H Hwang
(74) *Attorney, Agent, or Firm* — Hoffman Warnick LLC; Ernest G. Cusick

(57) ABSTRACT

A method and apparatus for visually detecting and measuring retention assembly tightness are disclosed. In an embodiment, an optical device is used to obtain at least an image of a retention assembly, the optical device being insertable into a slot between two stator core laminations and directable toward a side view of the retention assembly. The image is displayed on a display, and a measurer is used to determine a tightness of a retention assembly.

20 Claims, 3 Drawing Sheets

VISUAL INSPECTION-BASED GENERATOR RETENTION ASSEMBLY TIGHTNESS DETECTION

BACKGROUND OF THE INVENTION

The invention relates generally to the assessment of the condition of dynamoelectric machines. More particularly, the invention relates to a visual inspection-based method and apparatus for measuring the tightness of retaining ripple springs in dynamoelectric machines, particularly electric generators.

Dynamoelectric machines such as electric generators include a rotor and a stator. Rotors are generally constructed from a steel forging and include a number of slots that run the length of the rotor. Rotors are electrically wound by placing conductors referred to as rotor windings into the slots of the rotor.

Stators are generally constructed from a number of stacked, metal laminations. Stators also include slots, which run the length of the stator. Stators are electrically wound by placing conductors known as stator coils into the armature slots of the stator.

Conventional stator coils are frequently held in place in stator slots using a retention assembly such as a stator wedge assembly including a stator wedge, a top retaining ripple spring, and a shim. In this configuration, a stator coil is placed into an armature slot, a shim is placed above the stator coil, a top ripple spring is placed above the shim, and a stator wedge having a beveled edge is driven into a groove near the head of the armature slot, securing the stator coil, the shim, and the top ripple spring. The top ripple spring provides compressive force to keep the stator coils held firmly in the armature slot.

Over time, stator wedges may become loose. If a stator wedge becomes loose, it can permit a stator coil to vibrate, which can cause catastrophic failure in an electric generator. In order to avoid such vibration, it is desirable to periodically inspect the tightness of the ripple springs. Such inspections present a challenge, because ripple springs are difficult to access within a generator and are concealed by the stator wedge.

There are a number of conventional approaches to inspecting the compression of ripple springs. One approach involves manually tapping the stator wedges. Another approach involves measuring the depth of the surface of ripple springs through pre-formed test holes in the wedge. A third approach involves physically displacing the wedge and measuring the resulting wedge movement.

There are significant challenges associated with the conventional approaches to testing ripple-spring tightness. The first approach, manually tapping stator wedges, is extremely subjective. The results vary greatly between different inspectors.

The second approach, using a depth gauge to take measurements through pre-formed test holes, is time consuming and is only possible in generators having stator wedges with pre-formed test holes. Many generators do not have such pre-formed test holes. In order to use this method on existing generators without test holes in the stator wedges, the units must be rewound using wedges with access holes.

The third approach, physically displacing the stator wedge, involves impacting a stator wedge and then measuring the displacement of the stator wedge with a sensor such as an optical or capacitive sensor to give an indirect indication of the compression of the ripple spring beneath the stator wedge.

BRIEF DESCRIPTION OF THE INVENTION

A first aspect of the disclosure provides an apparatus for inspecting a retention assembly of a dynamoelectric machine, the apparatus comprising: an optical device for obtaining at least an image of the retention assembly, the optical device being insertable into a slot between two stator core laminations and directable toward a side view of the retention assembly, wherein the retention assembly includes at least a wedging member, a shim, and a retaining ripple spring between the wedging member and the shim; a display for displaying an image obtained by the optical device; a measurer for measuring a distance between the wedging member and the shim.

A second aspect of the disclosure provides a dynamoelectric machine comprising: a rotor; a stator surrounding the rotor; and a visual inspection device installed in a core of the stator, the visual inspection device including: an optical device for obtaining at least an image of a retention assembly, the retention assembly including a wedging member, a shim, and a retaining ripple spring between the wedging member and the shim, the optical device being installed in a slot between two stator core laminations and directable at a side view of the retention assembly; a display for displaying an image obtained by the optical device; and a measurer for measuring a distance between the wedging member and the shim.

A third aspect of the disclosure provides a method for visually inspecting a retention assembly of a dynamoelectric machine, the method comprising: placing an optical device in a stator core of the dynamoelectric machine, the placing including positioning the optical device in a slot between at least two stator core laminations, and directing the optical device toward a side view of the retention assembly, wherein the retention assembly includes a wedging member, a shim, and a retaining ripple spring located between the wedging member and the shim; using the optical device, obtaining and transmitting an image of the retention assembly to a display; measuring a distance between the wedging member and the shim using the image; calculating a remaining deflection of the retaining ripple spring, the remaining deflection being equal to a difference between the distance between the wedging member and the shim and a thickness of the retaining ripple spring; and determining a load value on the retaining ripple spring in units of force, using the remaining deflection of the retaining ripple spring and a known load versus deflection correlation.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a dynamoelectric machine. Although embodiments of the invention are illustrated relative to a dynamoelectric machine in the form of a generator, it is understood that the teachings are equally applicable to other electric machines including, but not limited to motors. Further, at least one embodiment of the present invention is described below in reference to a nominal size and including a set of nominal dimensions. However, it should be apparent to those skilled in the art that embodiments of the present invention are likewise applicable to any suitable generator and/or engine. Further, it should be apparent to those skilled in the art that embodiments of the present invention are likewise applicable to various scales of the nominal size and/or nominal dimensions.

As indicated above, aspects of the invention provide an apparatus and method for visually inspecting a retention assembly of a generator. FIGS. 1-4 show different aspects of an electric generator and configurations providing for a visual inspection apparatus.

Figure 1:
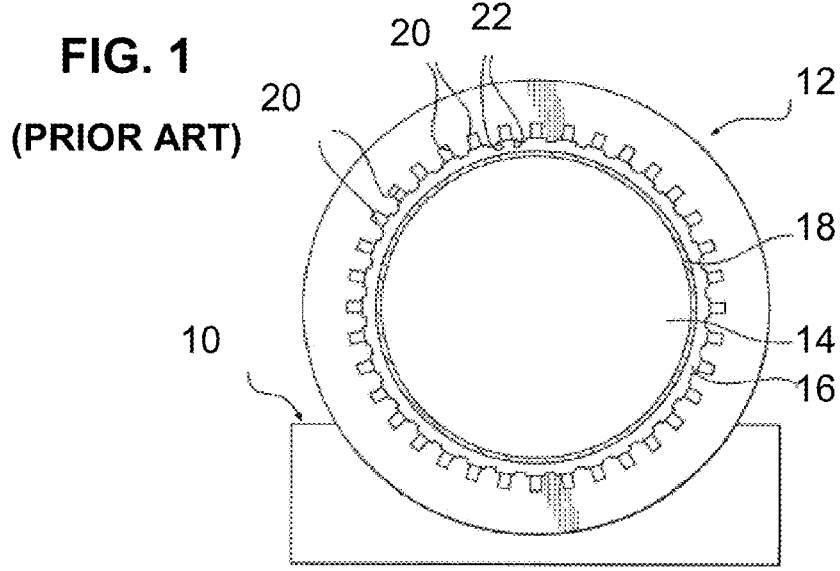
FIG. 1 shows a diagrammatic cross sectional view of a conventional electric generator having a rotor installed within a stator.

FIG. 1 shows a cross sectional view of a conventional electric generator 10, including a stator 12 surrounding a rotor 14. A narrow radial gap 16 exists between the stator assembly 12 and retaining ring 18, which is disposed about rotor 14. In some generators, radial gap 16 may be as narrow as about 3.8 cm (about 1.5 inch), although it may be either wider or narrower in various embodiments. Stator 12 includes an annular array of axially extending armature slots 20, each of which may be formed in stator 12 with a stator tooth 22 formed on either side thereof.

Figure 2:
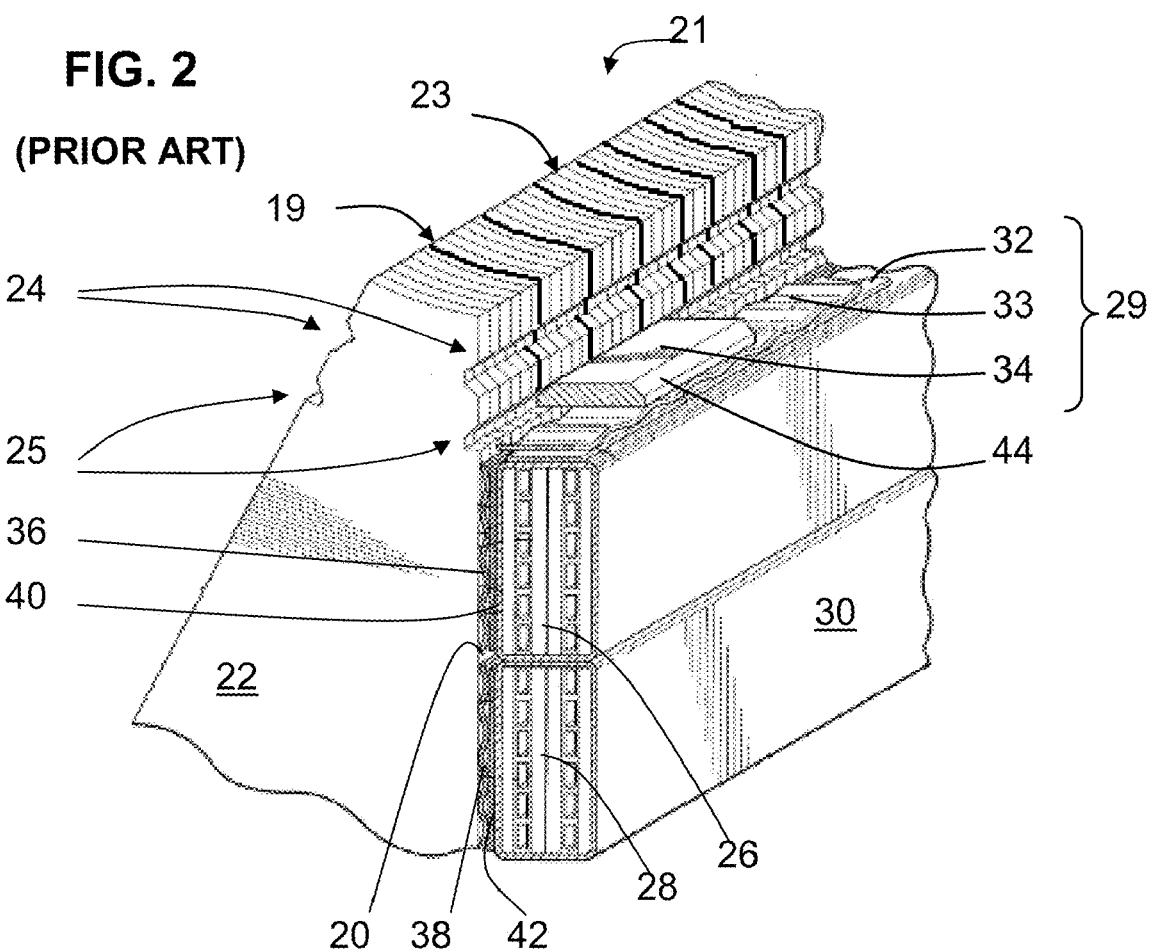
FIG. 2 shows a partial isometric view of a conventional stator in an electric generator as depicted in FIG. 1.

As shown in FIG. 2, each stator tooth 22 is made of a plurality of punchings or laminations 23, and includes a pair of axially extending grooves 24, 25 which are radially disposed with respect to each other. Thus, each armature slot 20 includes two pairs of generally parallel grooves 24, 25 formed therein. Stator coils 26, 28, which may be partially or wholly wrapped in an insulation layer 30, are disposed in each of the armature slots 20 of stator 12. In a typical stator 12, a pair of stator coils 26, 28 is stacked within each armature slot 20, one radially disposed on top of the other.

Stator coils 26, 28 are retained in armature slots 20 by retention assembly 29. In some embodiments, retention assembly 29 may be in the form of a stator wedge assembly (FIGS. 2-3), although any other type of retention assembly may be used to retain coils 26, 28 in armature slots 20. As shown in FIG. 2, retention assembly 29 may include a filler member, such as shim 32; a retaining ripple spring 33; and a wedging member 34. One or more shim 32 is typically placed radially inwardly from the top stator coil 26. Retaining ripple spring 33 may be disposed within the armature slot 20 radially inwardly from shim 32. Retaining ripple spring 33 may be made of, for example, glass fiber roving fabric bonded with a high temperature resistant synthetic resin matrix.

As further shown in FIG. 2, a filler member such as a first side ripple spring 36 may be disposed in armature slot 20, perpendicular to retaining ripple spring 33, between top stator coil 26 and stator tooth 22. Another filler member such a second side ripple spring 38 may be disposed in armature slot 20 perpendicular to retaining ripple spring 33 between bottom stator coil 28 and stator tooth 22. Optionally, one or more additional filler members such as first and second side slot fillers or shims 40, 42 may be placed between the side ripple springs 36, 38 and the respective stator coils 26, 28. Alternatively, side shims 40, 42 may be placed in armature slot 20 between stator tooth 22 and stator coils 26, 28 without side ripple springs 36, 38. Side ripple springs 36, 38 and side shims 40, 42 are designed to fill any axial gap that is created between stator coils 26, 28 and stator tooth 22 and to increase tightness between stator coils 26, 28 and stator tooth 22 in the tangential direction.

One or more wedging members 34 may be installed within armature slot 20 radially inwardly from retaining ripple spring 33. Wedging member 34 typically has beveled edges 44 which engage correspondingly shaped grooves 24, 25 in the side walls of stator tooth 22. Wedging member 34 is installed by sliding wedging member 34 into at least one of parallel grooves 24, 25. Wedging member 34 compresses retaining ripple spring 33 against shim 32, which is in turn compressed against top stator coil 26 to tightly secure stator coils 26, 28 radially within armature slot 20. In another embodiment, retaining ripple spring 33 may be located between wedging member 34 and insulated stator coil 26 without shim 32 present.

Over time, retaining ripple spring 33 can lose resiliency such that wedging member 34 can become loose, permitting coils 26, 28 to vibrate. Such vibration of coils 26, 28 can result in damage to coils 26, 28 and failure of coil insulation 30. Inspection of retention assembly 29 is therefore desirable to identify a need for corrective action before this occurs.

Figure 3:
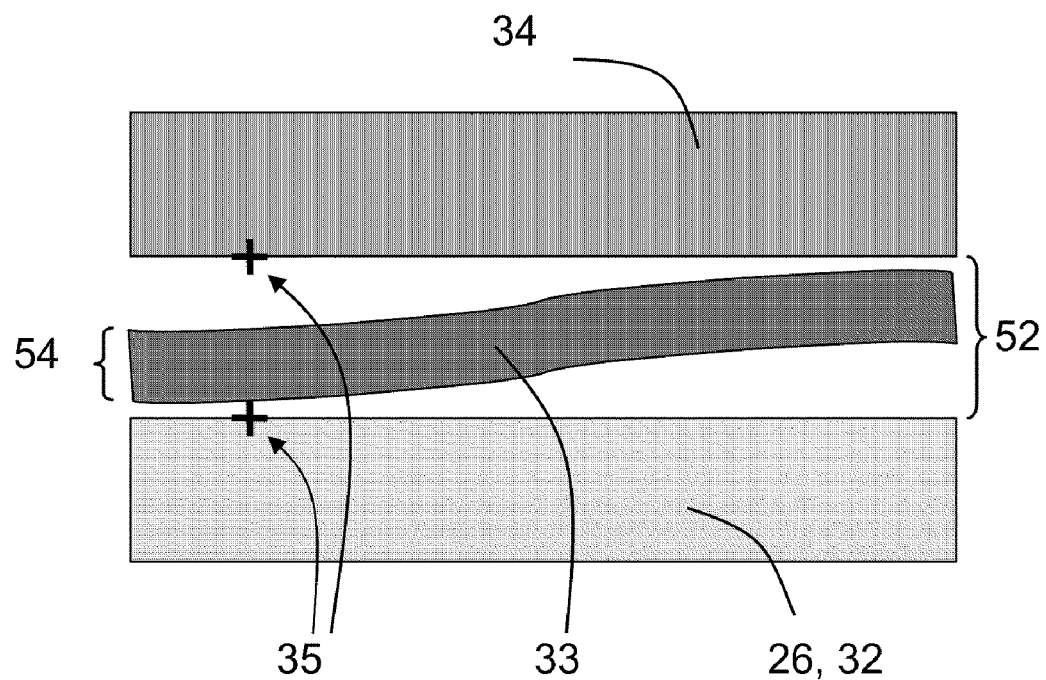
FIG. 3 shows a cross sectional view of a retention assembly in accordance with an embodiment of the invention.
Figure 4:
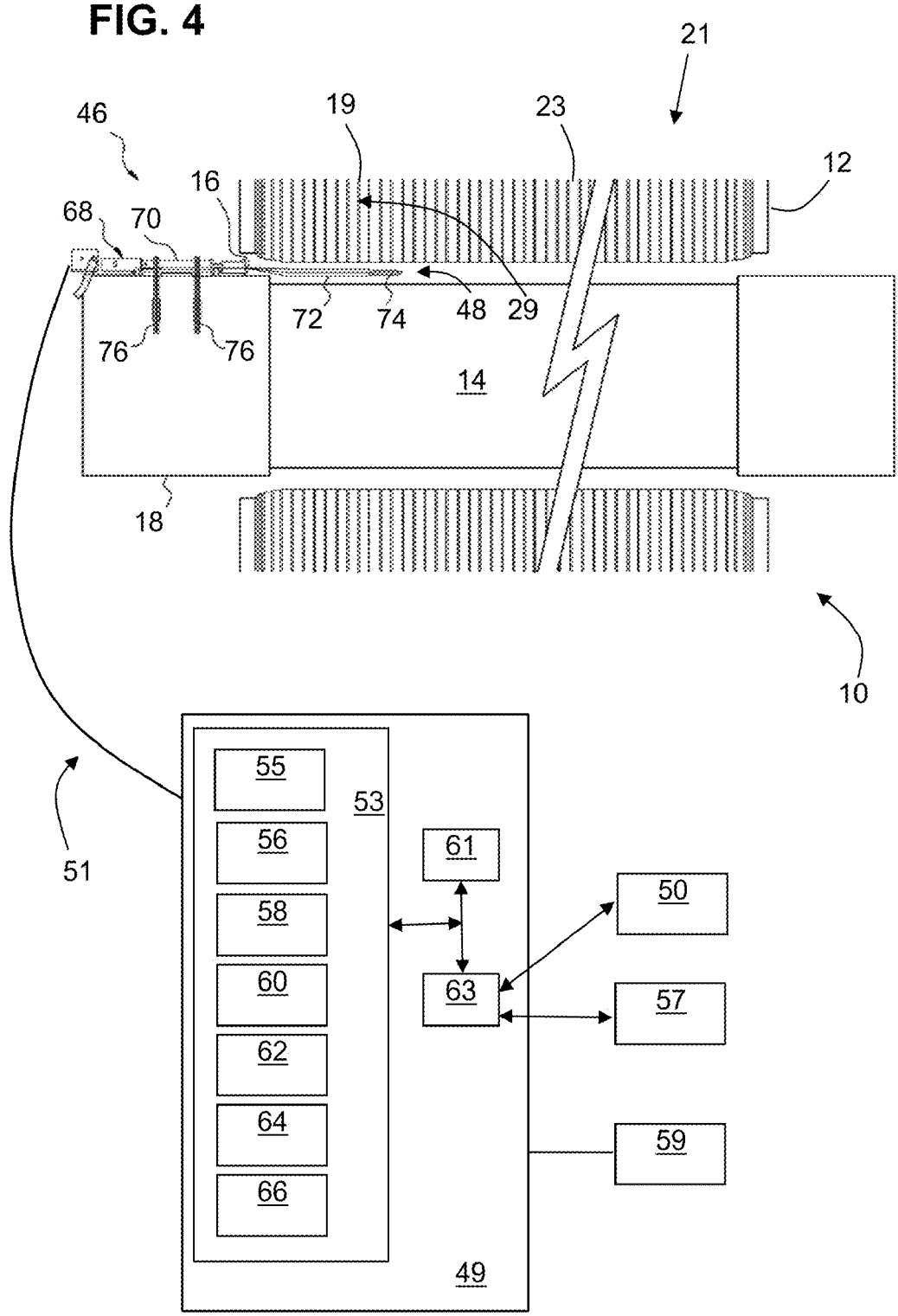
FIG. 4 shows a side plan view of a robotic manipulator positioned in a generator in accordance with an embodiment of the invention.

As shown in FIG. 4, a visual inspection apparatus 46 is provided herein for inspecting the retention assembly. Visual inspection apparatus 46 includes an optical device 48 for obtaining one or more images of the retention assembly, which may be in the form of retention assembly 29. In one embodiment, optical device 48 may be a borescope. Where visual inspection apparatus 46 is used to inspect retention assembly 29, optical device 48 is insertable into slot 19 between two stator laminations 23 making up core 21 of stator 12, and is directable toward a side view of retention assembly 29 (as illustrated in FIG. 3).

As shown in FIG. 4, visual inspection apparatus 46 is linked via coupler 51 to computer system 49. As shown, computer system 49 includes a processor 61, a memory 53, and input/output (I/O) interfaces 63 operably connected to one another. Further, computer system 49 is shown in communication with display 50, external I/O devices/resources 57, and storage unit 59. Display 50 displays an image(s) of retention assembly 29 obtained by optical device 48. I/O devices 57 may include any type of user input device such as a mouse, keyboard, joystick, or other selection device. In general, processor 61 executes computer program code which provides the functions of computer system 49. These modules, including device controller 55, measurer 56, calculator 58, spring load determinator 60, wedging member tightness determinator 62, comparator 64, and estimator 66, are stored in memory 53 and/or storage unit 59, and perform the functions and/or steps of the present invention as described herein. Memory 53 and/or storage unit 59 can comprise any combination of various types of data storage media that reside at one or more physical locations. To this extent, storage unit 59 could include one or more storage devices, such as a magnetic disk drive or an optical disk drive. Still further, it is understood that one or more additional components not shown in FIG. 4 can be included in computer system 49. Additionally, in some embodiments one or more external devices 57, display 50, and/or storage unit 59 could be contained within computer system 49, not externally as shown.

As noted, computer system 49 includes a measurer 56 for measuring a distance 52 (FIG. 3) between the surfaces in direct contact with retaining ripple spring 33 which provide a reaction force to the force imparted by retaining ripple spring 33. In an embodiment, these two surfaces are of wedging member 34 and shim 32. In embodiments not including a shim 32 between retaining ripple spring 33 and insulated coil 26, distance 52 is measured between wedging member 34 and a radially outward facing surface of insulated coil 26.

Measurer 56 may include a computer-based image analysis algorithm for defining the edges of features depicted in the image. Measurer 56 may further include an on-screen position selector displayed on display 50, capable of positioning a pair of locations 35 on the image, and appropriate logic (e.g., software and/or circuitry) to determine the linear distance between the selected positions. In one embodiment, this logic may be embedded into computer control of optical device 48. In another embodiment, this logic may reside in memory 53 on computer 49, which receives images collected by optical device 48 (FIG. 4). Following collection and measuring, image data may be archived, reported, and stored in memory 53 and/or in storage unit 59.

Computer system 49 further includes a calculator 58 for calculating a remaining deflection of retaining ripple spring 33. The remaining deflection of retaining ripple spring 33 is the amount of distance or displacement between the current position of retaining ripple spring 33 and the position resulting from having retaining ripple spring 33 fully compressed. The remaining deflection can be calculated by finding the difference between distance 52 and a thickness 54 of retaining ripple spring 33. Thickness 54 of retaining ripple spring 33 may either be measured by measurer 56, or may be a known characteristic from construction or prior measurement.

Computer system 49 further includes a spring load determinator 60 for determining a value of load on retaining ripple spring 33 in units of force, based on the remaining deflection of retaining ripple spring 33 and a known load versus deflection correlation. The known load versus deflection correlation may be in the form of a load versus deflection curve. Such a load versus deflection curve may be readily available as a technical data characteristic of a commercially available retaining ripple spring 33. Computer system 49 further includes wedging member tightness determinator 62 for determining a tightness of wedging member 34 in units of force per unit length. The tightness of wedging member 34 may be calculated by dividing a load on retaining ripple spring 33 by a length of wedging member 34. Thus, tightness of wedging member 34 may be expressed in units of force per unit length.

Computer system 49 further includes a comparator 64 for comparing the determined load on retaining ripple spring 33 to a design requirement value for retention assembly 29. Estimator 66 may then estimate a remaining safe operation time, based on a reduction in the retaining ripple spring force between successive compared determinations, and an estimated remaining operation time until the retaining ripple spring load value is expected to exceed the design requirement value for retention assembly 29.

In an embodiment, shown in FIG. 4, visual inspection apparatus 46 may include a robotic manipulator 68 for installing and positioning optical device 48 for visual inspection of stator 12. In an embodiment, robotic manipulator 68 may be a miniature air gap inspection crawler, and may include a tractor section 70, a mast section 72 affixed to the tractor section 70, and an inspection head section 74 affixed to mast section 72.

Robotic manipulator 68 allows visual inspection apparatus 46 to inspect retention assembly 29 in stator 12 in situ, with rotor 14 remaining installed within stator 12 as in FIGS. 1 and 4. Alternatively, retention assembly 29 can be accessed during assembly or during overhaul of generator 10, when rotor 14 is removed. Robotic manipulator 68 may be guided by an operator along the length of stator 12 to inspect retention assemblies 29. Electrical signals may be transmitted via coupler 51 between robotic manipulator 68 and computer system 49 to control positioning of robotic manipulator 68. Coupler 51 may be an electrical cable, a wireless transmission, or other known communication pathway. Output signals from optical device 48 on robotic manipulator 68 may also be transmitted via coupler 51 between robotic manipulator 68 and computer system 49.

In another embodiment, visual inspection apparatus 46 may be installed in a core of stator 12. Stator core 12 may further comprise a port located on an end of stator 12 for housing visual inspection device 46 during operation of the dynamoelectric machine. Visual inspection apparatus 46 may further be placed in a slot 19 and mounted directly to a stator tooth 23 for in-operation inspection of the retention assembly. In such an embodiment, images collected of retention assembly 29 may be transmitted via coupler 51 to computer system 49 and measurer 56.

Also provided is a method for visually inspecting retention assembly 29 of a dynamoelectric machine. As shown in FIG. 4, optical device 48 may be placed in core 21 of stator 12. Optical device 48 is positioned in air vent slot 19 between at least two stator core laminations 23, and directed toward a side view of retention assembly 29 (FIGS. 2-3).

Using optical device 48, an image of retention assembly 29 is obtained and transmitted to a display 50. Distance 52 between the wedging member 34 and shim 32 is measured using the image as described herein, and a remaining deflection of retaining ripple spring 33 is calculated. The remaining deflection of retaining ripple spring 33 is equal to a difference between distance 52 and thickness 54 of retaining ripple spring 33. Using the remaining deflection, a load value on retaining ripple spring 33 can be determined in units of force, using the remaining deflection of retaining ripple spring 33 and a known load versus deflection correlation. The known load versus deflection correlation may be in the form of a load versus deflection curve, and may be readily available as a technical data characteristic of a commercially available retaining ripple spring 33. The determined retaining ripple spring load value can then be compared with a design requirement for a given retention assembly 29 to determine the acceptability of the load on retaining ripple spring 33.

The value of the load on retaining ripple spring 33 can also be used to estimate a remaining safe operation time for generator 10. The remaining safe operation time can be estimated by determining the load on retaining ripple spring 33 at successive points in time, comparing the load on retaining ripple spring 33 determined at the respective successive time points, and determining a reduction in retaining ripple spring load. Given the reduction in retaining ripple spring load, a remaining operation time can be estimated before the retaining ripple spring load value will exceed design requirement parameters for retention assembly 29. The remaining operation time determination may also be based in part on the tightness of adjacent wedging members 34.

As previously noted, in order to obtain an image of the retention assembly, optical device 48 is placed in core 21 of a stator 12, in a slot 19 between at least two laminations 23. A robotic manipulator 68 such as a miniature air gap inspection crawler may be used to position optical device 48 for in situ inspection of retention assembly 29, allowing rotor 14 to remain installed within stator 12 during inspection. Robotic manipulator 68 may include a tractor section 70 for providing circumferential locomotion of the visual inspection device 46 about a retaining ring 18 of generator 10. Retaining ring 18 may include a plurality of tracks 76 along which tractor section 70 may move robotic manipulator 68. Robotic manipulator further includes mast section 72 affixed to the tractor section 70. In an embodiment, optical device 48 may be a borescope.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. In addition to retention assembly 29 as depicted herein, visual inspection apparatus 46 may be used to inspect other components of generator 10. Further, while retention assembly 29 has been illustrated as a stator wedge assembly (FIGS. 2-3), it is understood that other embodiments may be visually inspected without departing from the scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for inspecting a retention assembly of a dynamoelectric machine, the apparatus comprising:
   an optical device configured to obtain at least an image of the retention assembly, the optical device being insertable into a slot between two stator core laminations and directable toward a side view of the retention assembly, wherein the retention assembly includes at least a wedging member, a shim, and a retaining ripple spring between the wedging member and the shim;
   a display configured to display an image obtained by the optical device; and
   a measurer configured to measure a distance between the wedging member and the shim.

2. The apparatus of claim 1, wherein the optical device comprises a borescope.

3. The apparatus of claim 1, further comprising a calculator configured to calculate a remaining deflection of the retaining ripple spring, wherein the remaining deflection is equal to a difference between the distance between the wedging member and the shim and a thickness of the retaining ripple spring.

4. The apparatus of claim 3, wherein the thickness of the retaining ripple spring is determined by the measurer.

5. The apparatus of claim 3, further comprising a spring load determinator configured to determine a load on the retaining ripple spring in units of force, based on the remaining deflection of the retaining ripple spring and a known load versus deflection correlation.

6. The apparatus of claim 5, further comprising a wedging member tightness determinator configured to determine a tightness of the wedging member in units of force per unit length, the tightness being equal to the load on the retaining ripple spring divided by a length of the wedging member.

7. The apparatus of claim 5, further comprising a comparator configured to compare the load on the retaining ripple spring to a design requirement value for the retention assembly.

8. The apparatus of claim 7, further comprising an estimator configured to estimate a remaining safe operation time, wherein the remaining safe operation time is based on a reduction in the load on the retaining ripple spring between successive determinations, and an estimated operation time remaining until the load on the retaining ripple spring exceeds the design requirement value for the retention assembly.

9. The apparatus of claim 1, further comprising a robotic manipulator configured to position the optical device, the robotic manipulator comprising:
   a tractor section,
   a mast section affixed to the tractor section, and
   an inspection head section affixed to the mast section, the inspection head including the optical device.

10. The apparatus of claim 1, wherein the retention assembly is inspected in situ.

11. A dynamoelectric machine comprising:
    a rotor;
    a stator surrounding the rotor; and
    a visual inspection device installed in a core of the stator, the visual inspection device including:
    an optical device configured to obtain at least an image of a retention assembly, the retention assembly including a wedging member, a shim, and a retaining ripple spring between the wedging member and the shim, the optical device being installed in a slot between two stator core laminations and directable at a side view of the retention assembly;
    a display configured to display an image obtained by the optical device; and
    a measurer configured to measure a distance between the wedging member and the shim.

12. The dynamoelectric machine of claim 11, wherein the optical device comprises a borescope.

13. The dynamoelectric machine of claim 11, further comprising:
    a calculator configured to calculate a remaining deflection of the retaining ripple spring, wherein the remaining deflection is equal to a difference between the distance between the wedging member and the shim and a thickness of the retaining ripple spring; and
    a spring load determinator configured to determine a load on the retaining ripple spring in units of force, based on the remaining deflection of the retaining ripple spring and a known load versus deflection correlation.

14. The dynamoelectric machine of claim 13, further comprising a wedging member tightness determinator configured to determine a tightness of the wedging member in units of force per unit length, the tightness being equal to the load on the retaining ripple spring divided by a length of the wedging member.

15. The dynamoelectric machine of claim 13, further comprising:
    a comparator configured to compare the load on the retaining ripple spring to a design requirement value for the retention assembly; and
    an estimator configured to estimate a remaining safe operation time for the dynamoelectric machine, wherein the remaining safe operation time is based on a reduction in the load on the retaining ripple spring between successive determinations, and an estimated operation time remaining until the load on the retaining ripple spring exceeds the design requirement value for the retention assembly.

16. The dynamoelectric machine of claim 11, wherein the visual inspection device further comprises a robotic manipulator configured to position the optical device for in situ inspection of the retention assembly, the robotic manipulator comprising:
   a tractor section configured to provide circumferential locomotion of the visual inspection device about a retaining ring of the dynamoelectric machine;
   a mast section affixed to the tractor section, the mast section including a plurality of telescoping sections; and
   an inspection head section affixed to the mast section, the inspection head including the optical device.

17. The dynamoelectric machine of claim 11, wherein the stator further comprises a port located on an end of the stator configured to house the visual inspection device during operation of the dynamoelectric machine.

18. A method for visually inspecting a retention assembly of a dynamoelectric machine, the method comprising:
   placing an optical device in a stator core of the dynamoelectric machine, the placing including positioning the optical device in a slot between at least two stator core laminations, and directing the optical device toward a side view of the retention assembly,
      wherein the retention assembly includes a wedging member, a shim, and a retaining ripple spring located between the wedging member and the shim;
   using the optical device, obtaining and transmitting an image of the retention assembly to a display;
   measuring a distance between the wedging member and the shim using the image;
   calculating a remaining deflection of the retaining ripple spring, the remaining deflection being equal to a difference between the distance between the wedging member and the shim and a thickness of the retaining ripple spring; and
   determining a load on the retaining ripple spring in units of force, using the remaining deflection of the retaining ripple spring and a known load versus deflection correlation.

19. The method of claim 18, further comprising:
   comparing the load on the retaining ripple spring to a design requirement value for the retention assembly; and
   estimating a remaining safe operation time for the dynamoelectric machine, wherein the remaining safe operation time is based on a reduction in the load on the retaining ripple spring between successive spring load determinations, and an estimated operation time remaining until the load on the retaining ripple spring exceeds the design requirement value for the retention assembly.

20. The method of claim 18, wherein the placing further includes using a robotic manipulator configured to position the optical device for in situ inspection of the retention assembly, the robotic manipulator comprising:
   a tractor section configured to provide circumferential locomotion of the visual inspection device about a retaining ring of the dynamoelectric machine;
   a mast section affixed to the tractor section, the mast section including a plurality of telescoping sections; and
   an inspection head section affixed to the mast section, the inspection head including the optical device.

* * * * *